(12) United States Patent  
Reuter et al.

(10) Patent No.: US 6,508,494 B1  
(45) Date of Patent: Jan. 21, 2003

(54) LOCKING ARRANGEMENT FOR A SWITCHGEAR CABINET

(75) Inventors: Wolfgang Reuter, Burbach (DE); Rolf Benner, Herborn-Amdorf (DE); Michael Scholl, Herborn (DE)

(73) Assignee: Rittal-Werk Rudolf Loh GmbH & Co. KG, Herborn (DE)

( * ) Notice: Subject to any disclaimer, the term of this patent is extended or adjusted under 35 U.S.C. 154(b) by 35 days.

(21) Appl. No.: 09/675,403

(22) Filed: Sep. 29, 2000

(30) Foreign Application Priority Data

Sep. 29, 1999 (DE) .......................................... 199 46 773

(51) Int. Cl.⁷ ................................................. E05C 3/16
(52) U.S. Cl. ............................................ 292/51; 292/25
(58) Field of Search ............................ 292/25, 51, 44, 292/45, 48, 53, 256, 256.5, 304

(56) References Cited

U.S. PATENT DOCUMENTS

| 1,636,748 A | * | 8/1927 | Santee | 292/48 |
| 1,740,827 A | * | 12/1929 | Mayea | 174/122 R |
| 2,270,219 A | * | 1/1942 | Persson | 292/5 |
| 2,460,961 A | * | 2/1949 | Wilson | 292/48 |
| 5,171,047 A | * | 12/1992 | Korb | 292/39 |
| 5,268,543 A | * | 12/1993 | Ramos | 200/43.11 |

FOREIGN PATENT DOCUMENTS

| DE | 90 10 175 U1 | 10/1990 |
| DE | 195 36 906 C1 | 11/1996 |

* cited by examiner

*Primary Examiner*—Gary Estremsky  
(74) *Attorney, Agent, or Firm*—Pauley Petersen Kinne & Erickson

(57) ABSTRACT

A locking arrangement for a switchgear cabinet, having a lock and two locking bars, wherein the locking bars are displaced in opposite directions to each other when the lock is operated. A dependably operating locking arrangement can be produced if in end areas facing away from the lock, the locking bars are hingedly coupled to respective lever arms of a locking lever. The locking lever has a second lever arm which is coupled to the first lever arm in the area of a pivot hinge and has an inclined pad. The pivot axis of the pivot hinge is arranged at a distance with respect to a push direction of the associated locking bar.

15 Claims, 1 Drawing Sheet

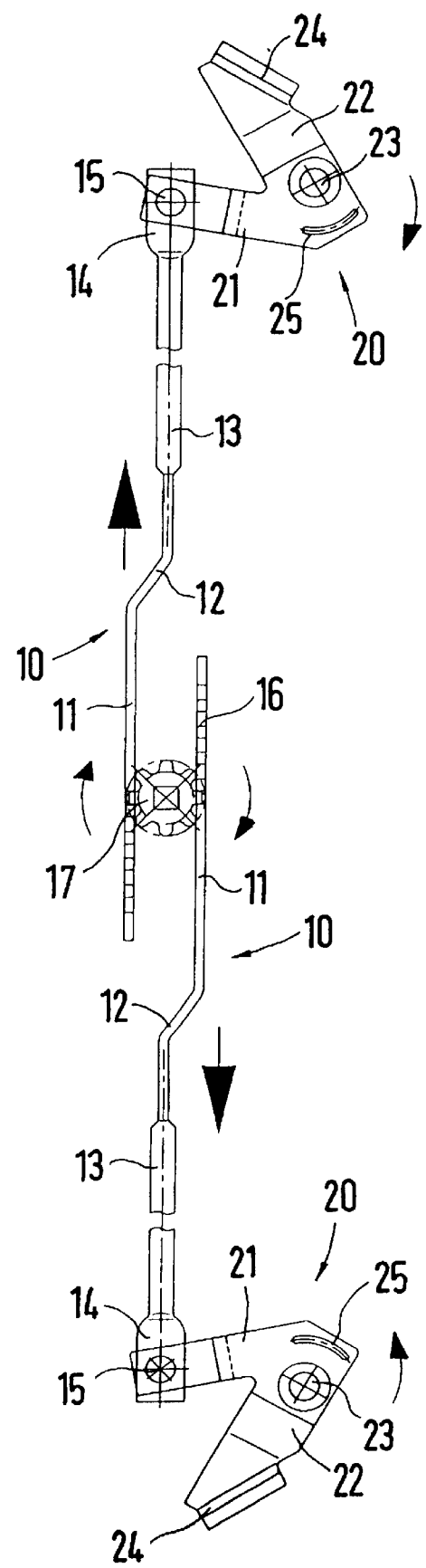

LOCKING ARRANGEMENT FOR A SWITCHGEAR CABINET

BACKGROUND OF THE INVENTION

1. Field of the Invention

This invention relates to a locking arrangement for a switchgear cabinet, having a lock and two locking bars, wherein the locking bars can be displaced in opposite directions with respect to each other when the lock is operated.

2. Description of Prior Art

Such a locking arrangement is known from German Patent Reference DE 195 36 906 C1. A lock housing, which is placed on a front of a cabinet door, is used in connection with this locking arrangement. A pinion is rotatably seated in the lock housing. Two pushrods can be driven and displaced in opposite directions to each other by the pinion. The pushrods have shoulders which extend through a door leaf. The locking bars are connected to the back of the door leaf. To enter into a locked state, the ends of the locking bars can be inserted into opposite locking elements, which are attached to the switchgear cabinet, as illustrated in German Patent Reference DE 90 10 175 U1.

Switchgear cabinet doors are customarily sealed against the switchgear cabinet, for which purpose sealing beads are used, which are applied as a foam on the insides of the switchgear cabinets. When closing the switchgear cabinet door, it is necessary to overcome the sealing pressure originating in the sealing bead.

SUMMARY OF THE INVENTION

It is one object of this invention to provide a locking arrangement of the type mentioned above, but wherein seal counterpressures created when the switchgear cabinet door is closed can be simply overcome.

This object is attained because in end areas facing away from the lock, the locking bars are hingedly coupled to respective lever arms of a locking lever. The locking lever has a second lever arm which is coupled to the first lever arm in the area of a pivot hinge and which has an inclined pad. The pivot axis of the pivot hinge is arranged at a distance with respect to a direction of push of the associated locking bar.

The locking forces generated by the lock can be reduced by the pivot lever. The lever forces generated are used for locking, wherein it is also possible to overcome high sealing forces, in particular.

In accordance with one preferred embodiment of this invention the lock has a pinion which meshes with teeth in the locking bars. The locking bars are arranged on diametrically opposite sides of the pinion, and the hinge axes of the hinges, which connect the locking bars with the first lever arm of the locking lever and the axis of rotation of the pinion, are located along one line. A symmetrical structure is thus created which can be used, for one, for simplifying the assembly. This locking arrangement can also be selectively used with doors which are hinged on the left or the right.

In accordance with one embodiment of this invention, the locking bars have a driving element and a connecting part, which are hingedly connected with each other. The driving element is maintained in a lock housing of the lock, and projects from the lock housing with a shoulder on which the connecting part is fastened. The locking lever is coupled to the end of the connecting part.

A simple construction of the locking bar results if it is made of a flat rod blank, from which the teeth are cut out on the lock side, and having a broad side in an area of the lock which extends vertically with respect to the plane of the connected door. Adjoining the lock, the flat bar blank is rotated by 90° to form a connecting part and its broad side is arranged parallel with the plane of the door. The hinge axes of the hinges connecting the locking lever with the locking bars extend vertically with respect to a plane of the door.

In the area of the ends facing the hinges the locking bars are flattened, and the first lever arm of the pivot lever is maintained in the area between the door leaf and the flat place. This results in a space-saving arrangement.

The pivot axis of the locking lever preferably extends vertically with respect to the plane of the door.

The locking lever can be designed as a one-piece stamped and bent element for reasons of simplifying its production.

To prevent the pivot hinge from highly mechanically stressing during the locking process, because of the sealing pressure created, on a side located opposite the inclined pad on the other side of the pivot hinge, the locking lever has a support element which is braced on an inside of the door.

In this case the support element can advantageously be designed as a stamped-out part projecting in a direction toward the door.

One embodiment of a locking device in accordance with this invention can be distinguished because the locking bars and the lock are attached to a locking cabinet door of a double door of a switchgear cabinet. The lock can be operated from the front of the locking cabinet door, and the front of the lock is covered by a closed cabinet counter door. Thus the lock is no longer accessible when the double doors of the switchgear cabinet are closed.

BRIEF DESCRIPTION OF THE DRAWINGS

This invention will be explained in greater detail in view of an exemplary embodiment represented in the drawings, wherein:

The single drawing FIGURE shows a locking bar arrangement used for locking double doors of a switchgear cabinet.

DESCRIPTION OF PREFERRED EMBODIMENTS

The locking bars have a lock, of which only a pinion 17 is shown for reasons of clarity. Locking bars 10 are arranged on two diametrically opposed sides of the pinion 17. The locking bars 10 have a driving element 11 and a connecting part 13 adjoining the driving element 11 via a right-angled bend 12. The locking bars 10 are made from a flat material. Teeth 16 are punched out of the driving elements 11 of the locking bars 10 in the area of the pinions 17. The teeth 16 mesh with the pinion 17. The broad sides of the locking bars 10 are arranged vertically with respect to the plane of the door in the area of the driving elements 11. The locking bars 10 are reshaped in the area of the right-angled bend 12 in such a way that the broad side in the area of the connecting parts 13 extends parallel with the plane of the door. The ends of the connecting parts 13 are rolled and form flat places 14. A bore extends through the flat places 14, into which a hinge bolt can be inserted. The hinge bolt connects a locking lever 20, forming a hinge 15 together with the locking bar 10. The hinge axes of the hinge 15 and the axis of rotation of the pinion 17 are arranged vertically with respect to the plane of the door and are aligned.

The pivot lever 20 has first and second lever arms 21 and 22. The lever arms 21, 22 are arranged at an acute angle with respect to each other. A pivot axis 23 is formed in the area of the connection of the first lever arm 21 with the second lever arm 22. The pivot axis 23 also extends vertically with respect to the plane of the door. For fastening the locking levers 20, welded-on bolts are attached to the door, which extend through bores of the locking levers 20 to form the pivot hinge.

On a free end, the second pivot lever has a bevel which is used as an inclined pad 24. During the locking process the locking lever 20 can slide up by means of the inclined pad 24 on a lock counterpart, mounted on the side of the switchgear cabinet. To prevent too much stress when the pivot hinge 23 slides up, a support element 25 is provided. The support element 25 is arranged on the second lever arm 22 on the side opposite the inclined pad 24. In the embodiment shown in the drawing, the support element 25 is shaped as a curved stamped-out part, which is supported on the inside of the cabinet door.

While operating the lock, the pinion 17 is rotated in a clockwise direction to achieve a locked position, as indicated by the curved arrows. Thus the locking bars 10 can be displaced with respect to each other, as shown by the large arrows in the drawing. The locking levers 20 are rotated about the pivot axes 23 because of the displacement of the locking bars 10, until the inclined pad 24 is locked together with the lock counterpart.

What is claimed is:

1. In a locking arrangement for a switchgear cabinet, having a lock and two locking bars, wherein the locking bars are displaced in opposite directions to each other when the lock is operated, the improvement comprising:

the locking bars (10) each having end areas facing away from the lock hingedly coupled to a first lever arm (21) of a locking lever (20);

the locking lever (20) having a second lever arm (22) coupled to the first lever arm (21) in an area of a pivot hinge and having an inclined pad (24); and a pivot axis (23) of the pivot hinge arranged at a distance with respect to a push direction of a corresponding one of the locking bars (10), the lock having a pinion (17) which meshes with a plurality of teeth (16) of the locking bars (10), the locking bars (10) arranged on diametrically opposite sides of the pinion (17), and a hinge axis of a hinge (15) that hingedly connects the locking bar with the first lever arm (21) of the locking lever (20) and an axis of rotation of the pinion (10) being aligned.

2. In the locking arrangement in accordance with claim 1, wherein the locking bars (10) have a driving element (11) connected to a connecting part (13), the driving (11) element is maintained in a lock housing of the lock and projects from the lock housing with a shoulder on which the connecting part (13) is fastened, and the locking lever (20) is coupled to an end of the connecting part (13).

3. In the locking arrangement in accordance with claim 1, wherein the locking bars (10) are made of a flat rod blank from which the teeth (16) are cut out on a lock side of the flat rod blank.

4. In the locking arrangement in accordance with claim 3, wherein in a second area of the ends facing the hinges (15) the locking bars (10) are flattened.

5. In the locking arrangement in accordance with claim 4, wherein a pivot axis (23) of the locking lever (20) extends vertically.

6. In the locking arrangement in accordance with claim 5, wherein the locking lever (20) is designed as a one-piece stamped and bent element.

7. In the locking arrangement in accordance with claim 6, wherein on a side located opposite an inclined pad (24) on an other side of the pivot hinge the locking lever (20) has a support element (25).

8. In the locking arrangement in accordance with claim 7, wherein the support element (25) is designed as a stamped-out part projecting toward the door.

9. In the locking arrangement in accordance with claim 1, wherein a pivot axis (23) of the locking lever (20) extends vertically.

10. In the locking arrangement in accordance with claim 1, wherein the locking lever (20) is designed as a one-piece stamped and bent element.

11. In the locking arrangement in accordance with claim 1, wherein on a side located opposite an inclined pad (24) on an other side of the pivot hinge the locking lever (20) has a support element (25).

12. In the locking arrangement in accordance with claim 11, wherein the support element (25) is designed as a stamped-out part projecting toward the door.

13. In a locking arrangement for a switchgear cabinet, having a lock and two locking bars, wherein the locking bars are displaced in opposite directions to each other when the lock is operated, the improvement comprising:

the locking bars (10) each having end areas facing away from the lock hingedly coupled to a first lever arm (21) of a locking lever (20);

the locking lever (20) having a second lever arm (22) coupled to the first lever arm (21) in an area of a pivot hinge and having an inclined pad (24); and a pivot axis (23) of the pivot hinge arranged at a distance with respect to a push direction of a corresponding one of the locking bars (10), the locking bars (10) made of a flat rod blank from which a plurality of teeth (16) are cut out on a lock side, and in a first area of the lock the flat rod blank is rotated 90° to form a connecting part (13), and a hinge axis of a hinge (15) connecting the locking lever (20) with the locking bar (10) extends vertically.

14. In the locking arrangement in accordance with claim 13, wherein the locking bars (10) have a driving element (11) connected to a connecting part (13), the driving (11) element is maintained in a lock housing of the lock and projects from the lock housing with a shoulder on which the connecting part (13) is fastened, and the locking lever (20) is coupled to an end of the connecting part (13).

15. In the locking arrangement in accordance with claim 13, wherein in a second area of the ends facing the hinges (15) the locking bars (10) are flattened.

* * * * *